May 27, 1930.  P. S. BANFF  1,759,832
ELECTRICAL COOKING APPARATUS
Filed Oct. 19, 1928  4 Sheets-Sheet 1
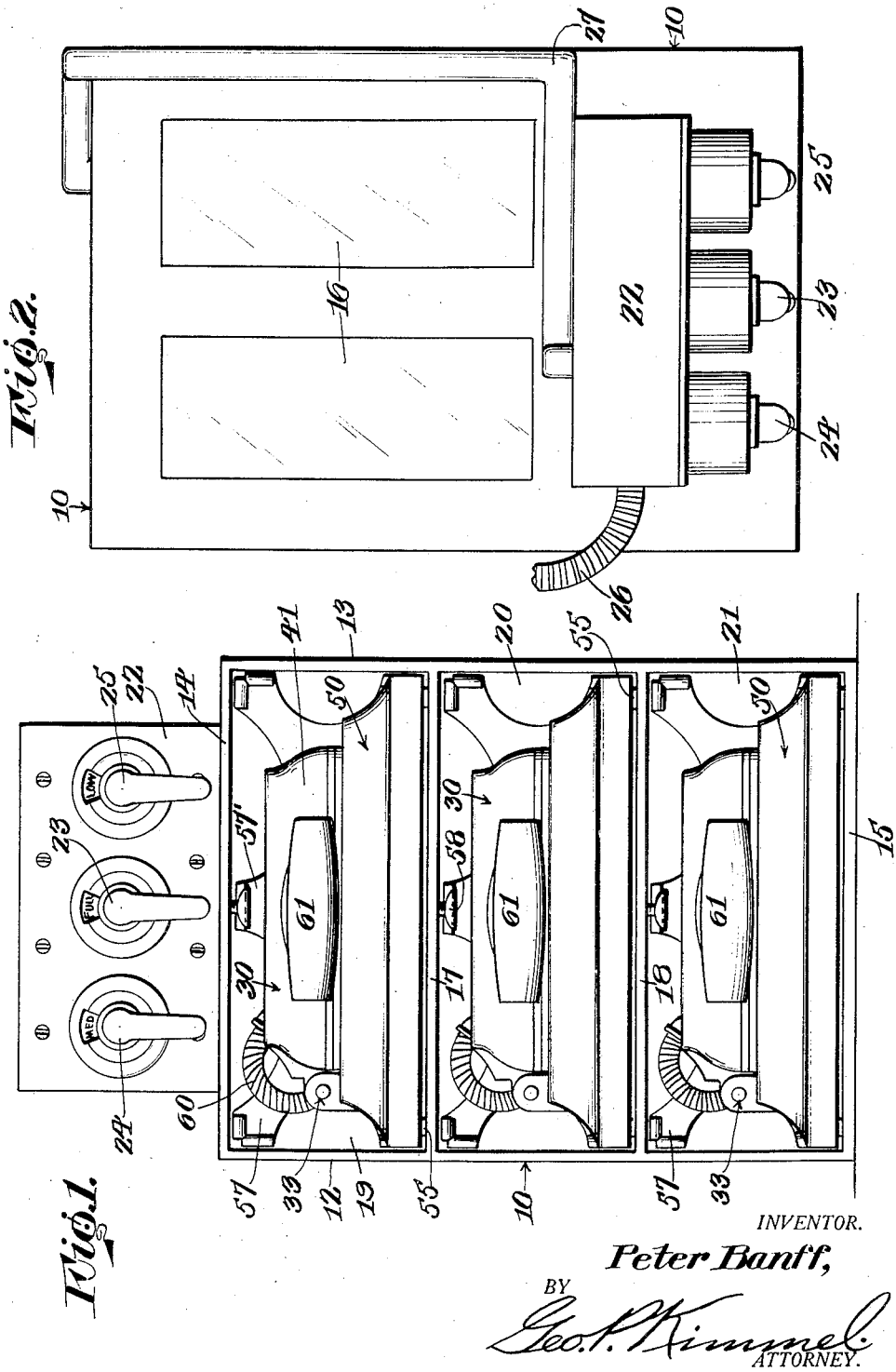
INVENTOR.
Peter Banff,
BY
Geo. F. Kimmel
ATTORNEY.

May 27, 1930.                P. S. BANFF                1,759,832
                    ELECTRICAL COOKING APPARATUS
                        Filed Oct. 19, 1928         4 Sheets-Sheet 2
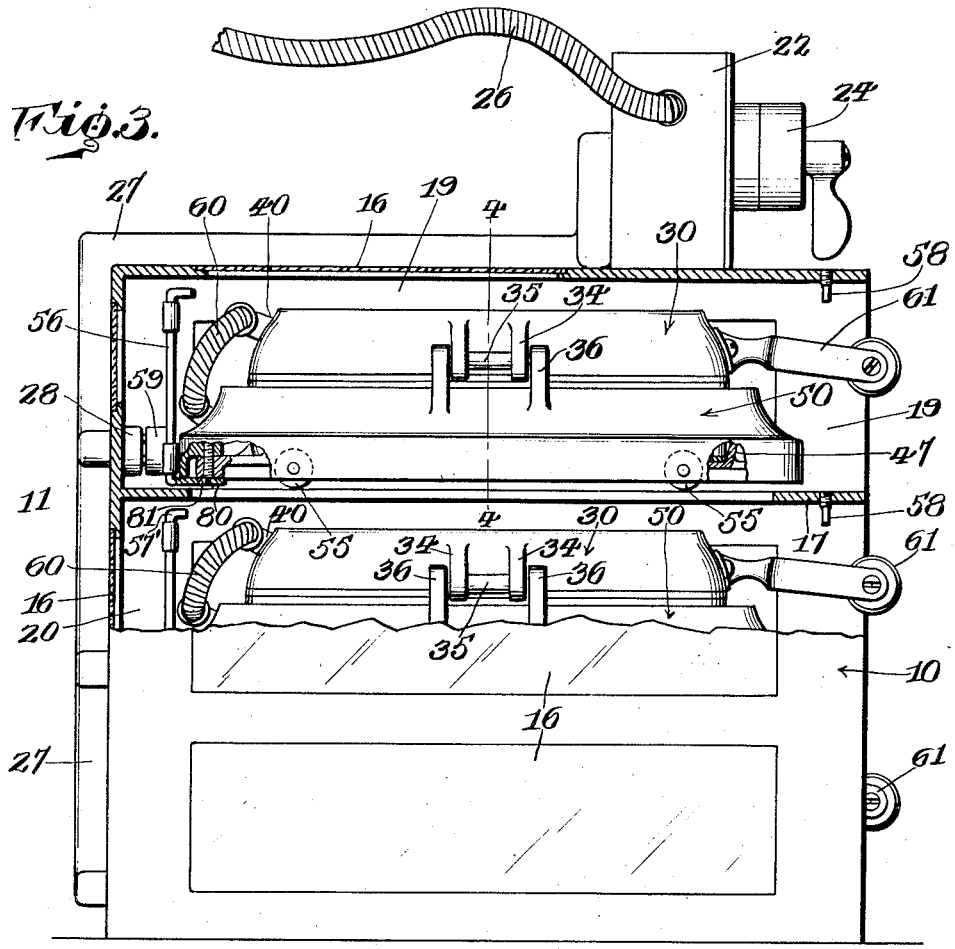
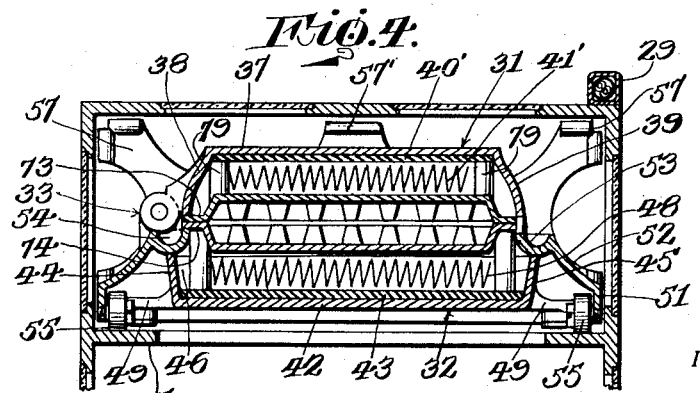
INVENTOR.
Peter Banff,
BY
Geo. P. Kimmel
ATTORNEY.

May 27, 1930. P. S. BANFF 1,759,832
ELECTRICAL COOKING APPARATUS
Filed Oct. 19, 1928 4 Sheets-Sheet 3
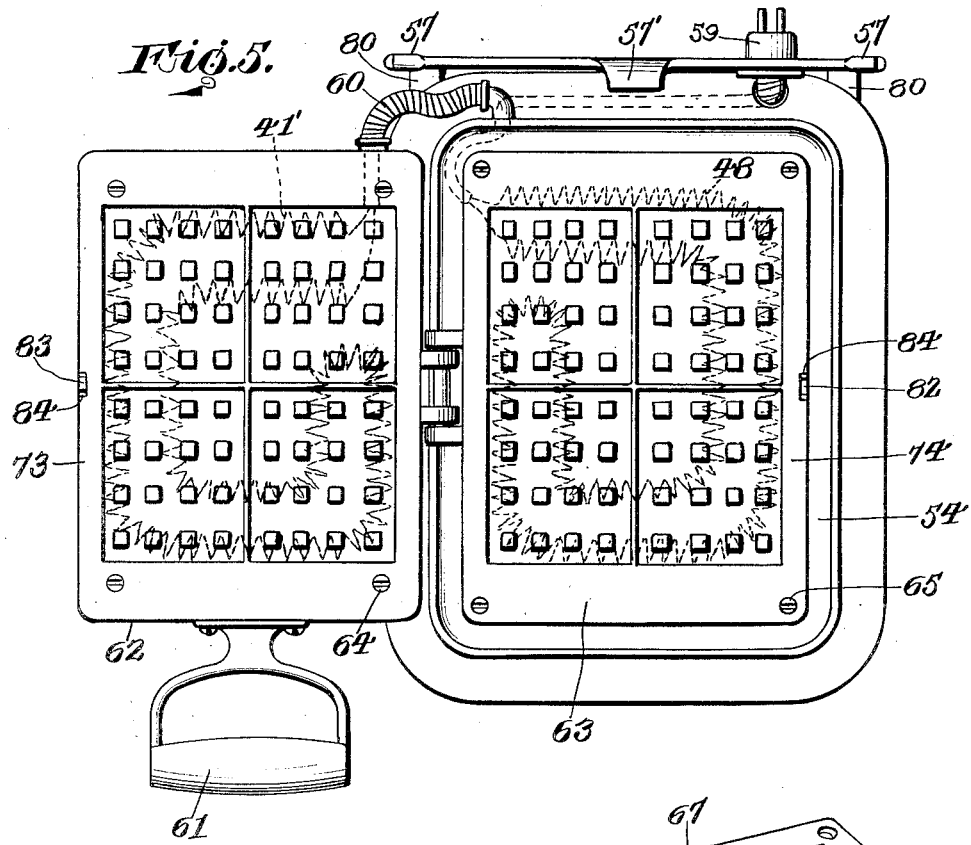
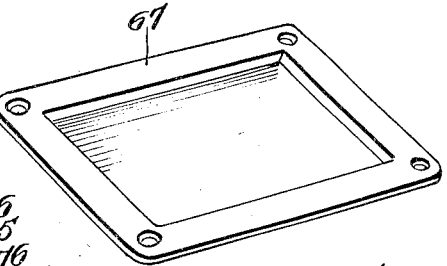
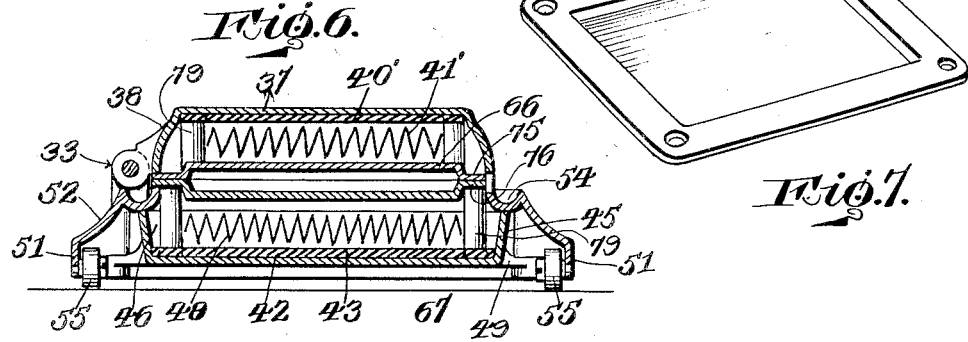
INVENTOR.
Peter Banff,
BY
Geo. P. Kimmel
ATTORNEY.

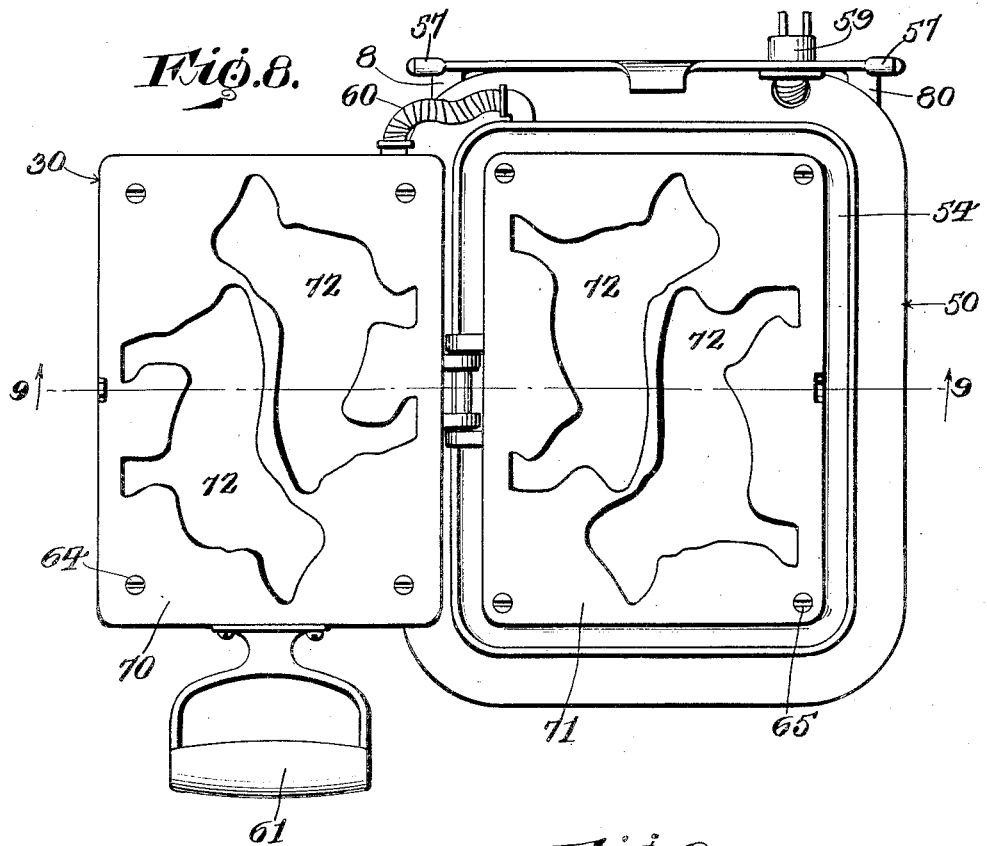

Patented May 27, 1930

1,759,832

UNITED STATES PATENT OFFICE

PETER S. BANFF, OF CHICAGO, ILLINOIS, ASSIGNOR, BY MESNE ASSIGNMENTS, TO SANITARY FOOD MACHINE CORPORATION, A CORPORATION OF ILLINOIS

ELECTRICAL COOKING APPARATUS

Application filed October 19, 1928. Serial No. 313,584.

This invention relates to an electrical cooking apparatus designed primarily for the production of food products, such as those termed hot dog and hot ham sandwiches and pig and bun, as well as waffles, wheat, corn and buckwheat cakes, biscuits, rolls, etc., but it is to be understood that an electrical cooking apparatus in accordance with this invention may be employed for any purposes for which it is found applicable, and the invention has for its object to provide, in a manner as hereinafter set forth, an apparatus of the class referred to including a plurality of electrically heated cooking elements for expeditiously, efficiently, conveniently and satisfactorily producing the articles of food desired.

A further object of the invention is to provide, in a manner as hereinafter set forth, an electrical cooking apparatus including electrically heated, superposed cooking elements capable of being selectively and simultaneously employed for cooking purposes.

A further object of the invention is to provide, in a manner as hereinafter set forth, an electrical cooking apparatus including electrically heated, superposed cooking elements and with the apparatus constructed and arranged whereby it will occupy materially reduced space with respect to the space now occupied by apparatuses of such class, especially when the apparatus is positioned in a window or on a counter.

A further object of the invention is to provide, in a manner as hereinafter set forth, an electrical cooking apparatus including superposed, electrically heated cooking elements capable of being independently handled and with the apparatus further provided with means for regulating or controlling the temperature of the heat.

Further objects of the invention are to provide, in a manner as hereinafter set forth, an electrical cooking apparatus which is simple in its construction and arrangement, strong, durable, compact, thoroughly efficient in its use, conveniently handled, readily installed, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a front elevation of an electrical cooking apparatus in accordance with this invention.

Figure 2 is a top plan view thereof.

Figure 3 is a side elevation partly broken away and party in section.

Figure 4 is a section on line 4—4 of Figure 3.

Figure 5 is a top plan view of one of the electrically heated cooking elements when open.

Figure 6 is a cross sectional view of a modified form of an electrically heated cooking element.

Figure 7 is a perspective view of a griddle plate employed in a modified form of electrically heated cooking element.

Figure 8 is a view similar to Figure 6 of still another modified form of electrically heated cooking element.

Figure 9 is a section on line 9—9 Figure 8.

The apparatus comprises an open front housing of the desired width and height and with the latter depending upon the number of cooking elements employed. Preferably the apparatus will be set up with three cooking elements and it is so illustrated. The housing is referred to generally at 10 and includes a back wall 11, a pair of side walls 12, 13, top wall 14 and a bottom 15. The body of the housing at its top, back and sides is formed with openings closed by transparent glass panels 16. The providing of the body of the housing with the openings reduces its weight so that it can be easily handled, and the closing of the openings by the panels conserves the heat within the housing. The housing is constructed of a suitable metallic material and is formed with superposed, spaced partitions 17, 18 which extend from the back wall 11 to the outer edges of the side walls 12, 13. The partition 17 in connection with the top 14 form a compartment 19 for the reception of a cooking element. The partitions 17, 18 coact to provide a compartment 20 for the reception of a cooking element, and the partition 18 in connection with the bottom 15 provides a compartment 21 for the reception of a cooking element.

Mounted upon the top 14 and positioned rearwardly with respect to the outer edge of the top is a combined regulating and controlling device 22 for the electrical current and such device is of known construction, however, as illustrated it includes a switch means as indicated at 23 for turning on the current in full to the cooking elements, a switch device as at 24 for controlling a medium supply of current for the cooking elements and a switching means as at 25 for controlling a low supply of current to the cooking elements. The current conducting means leading from the source of electrical energy of the device 22 is indicated as at 26.

The current conducting means which extends from the device 22 and leads to the cooking elements is arranged in a protector 27 positioned on the top 14 and against the outer face of the back 11 and arranged at the rear and near the bottom of each cooking element compartment is a forwardly projecting contact device 28 in permanent electrical connection with the conducting means within the protector 27. The contact devices 28 are carried by the back wall 11 and extend rearwardly and forwardly with respect thereto and the purpose of said contact devices 28 will be presently referred to. The contact devices are in the form of sockets.

The conducting means which is arranged within the protector 27 is indicated at 29. See Figure 4.

An electrically heated cooking element is slidably mounted in each of the compartments of the housing and said elements are referred to generally at 30. Each of said elements includes an upper section 31 and a lower section 32. The sections are loosely hinged together at one side thereof, as at 33 and the said sections are oppositely disposed with respect to each other. The section 31 is of less length than the section 32. The hinged connection between the sections includes a pair of spaced lugs at one side of section 31 and which are indicated at 34.

Carried by the lugs 34 is a pivot pin 35 which engages in a pair of spaced lugs 36 carried by one side of section 32. The lugs 34 depend and the lugs 36 extend upwardly and have the lugs 34 arranged therebetween.

The section 31 includes a top member 37 of rectangular contour, depending side members 38, 39 which are outwardly curved, a depending back member 40 which is also outwardly curved and a depending front member 41 which also is outwardly curved. Positioned against the inner face of the top member 37 is a plate of insulation 40'. Arranged within the section 31 is an electric heater 41'.

The section 32 comprises a bottom member 42 having a plate of insulation 43 mounted on the upper face thereof. Formed integral with the bottom member 42, extending upwardly therefrom and directed at an outward inclination are side members 44, 45, a back member 46 and a front member 47. The members 42, 44, 45, 46 and 47 provide a casing for an electric heater 48. Extended outwardly from each corner of the casing is a supporting arm 49 for a carrier referred to generally at 50. The supporting arms 49 are secured to the carrier by suitable holdfast devices.

The carrier completely surrounds the casing as well as seats on the top edges of the walls of the latter. The carrier is of rectangular contour and comprises a vertically disposed lower portion 51, an upstanding, inwardly curved intermediate portion 52 and a channel-shaped upper portion 53 which provides a groove 54 for collecting the overflow of dough during the cooking operation. The lugs 36 extend up from one side of the intermediate portion 52 of the carrier 50. The lower portion 51 of the carrier is spaced from and depends below the bottom member 42. Carried by the lower portion 51 of the carrier 50, at the sides of the latter are rollers 55 which travel on the sides of a partition with respect to the upper cooking elements, but with respect to the lower cooking elements the rollers 55 thereof travel on the upper face of the bottom 15 of the housing.

The section 31 of the cooking element is of less length and width than the length and width of the carrier 50. The section 31 is also of less length and less width than the casing of the section 32.

Each cooking element is provided at its rear with an offset, vertically disposed combined guide and stop plate 56 having arms 57 extending in close proximity to the sides of a compartment. The plate 56 further includes an upstanding arm 57', centrally thereof coacting with a stop 58 to arrest the outward movement of the cooking element. When the element is pulled outwardly with respect to a compartment the arm 57 engages the stop 58, as the latter is arranged in the path of said arm and further depends from the top of a compartment. The plate 56 near its bottom carries a rearwardly extending contact plug 59 engageable in a contact device 28, when the cooking element is shifted to the limit of its inward movement whereby the heaters of the cooking elements are electrically connected with a source of energy.

The section 31 has its electric heater connected with the electric heater of the section 32 by the flexible electrical connection 60 and the electric heater of the section 32 is electrically connected to the plug 59 and by this arrangement when the plug 59 coacts with a contact device 28 the electrical heaters are connected with a source of energy.

The section 31 of each cooking element has extended from the front thereof a handle 61 for the purpose of shifting the cooking element with respect to its compartment, that is to move the element in or to withdraw it from its compartment. Said handle member 61 further provides means for swinging section 31 from over section 32 when the cooking element is in its withdrawn position and by this arrangement access can be had to the interior of the cooking element or in other words the cooking element can be opened to supply dough thereto or to remove a cooked product therefrom.

With respect to Figures 4 and 5 the cooking element 30 is illustrated for the production of waffles and it includes a pair of oppositely disposed waffle forming plates 62, 63 removably connected respectively with the sections 31, 32 by detachable securing means 64, 65 respectively. The plates 62, 63 coact to provide the waffles when the plates are arranged in superposed relation and the heating means of the sections of the element 30 are active.

With respect to Figures 6 and 7 the cooking element 30 is illustrated for the production of wheat, corn and buckwheat cakes and it includes a pair of oppositely disposed griddle plates 66, 67 removably connected respectively to sections 31, 32 in the same manner as plates 62, 63. The plates 66, 67 coact to produce griddle cakes when the plates are in superposed relation and when the heating means of the sections 31, 32 of the cooking element are active. It does not necessitate the turning of a cake, as both sides of the batter or dough will be cooked when the sections 31, 32 are in superposed relation.

With respect to Figures 8 and 9 the cooking element 30 is illustrated for the production of sandwiches, termed hot dogs, and it includes a pair of oppositely disposed plates 70, 71 each having a pair of oppositely disposed molding cavities 72 to simulate the appearance of half of a dog. The cavities in the plate 70 are oppositely disposed with respect to the cavities in the plate 71. The cavities in the plate 70 coact with the cavities in the plate 71 for the purpose of producing a sandwich to simulate the appearance of a dog when the plates are in superposed relation and the heating means of the sections 31, 32 active. When producing a sandwich termed hot dogs, the dough is placed into the molding cavities of one of the plates, the sausages arranged in the dough, after which dough is placed in the cavities of the other of the plates, the plates brought into superposed relation, the heating means is then made active which produces a roll having embedded therein a sausage, and with the sandwich simulating the appearance of a dog. The sausage being arranged as to extend from each end of the roll or to simulate the appearance of the outer end of the head and also the tail of a dog.

The plates 62, 63, as well as the plates 66, 67, and also the plates 70, 71 have flat marginal portions which abut when each pair of plates is arranged in superposed relation. With respect to Figures 4 and 5 the flat marginal portions are indicated at 73, 74. With respect to Figures 6 and 7 the flat marginal portions are indicated at 75, 76 and the flat marginal portions of the plates as shown in Figure 8 are indicated at 77, 78.

The section 31 has formed integral therewith spacing posts 79 which extend from the top member 40 to a cooking plate and the section 32 has spacing posts 80 which are integral with the bottom member 42 and extend to a cooking plate.

The combined guide and stop plate 56 of each cooking element has its lower end formed with forwardly directed extensions 80 which are connected to the rear arms 49, that is to say the rear supporting arms 49 by the securing means 81 and the said means 81 is employed for securing the rear supporting arms 49 to the rear end of the carrier 50.

The partitions arranged within the housing are of skeleton form, whereby communication is established between the various compartments so that the heat from a lower compartment can enter an upper compartment.

The section 32 of the cooking element 30, centrally of its top is formed with a socket 82 which receives a depending lug 83 on one side of the section 31. The socket 82 and lug 83 coact to properly position the sections of the cooking element when arranged in superposed relation. The pair of cooking plates carried by the sections of the cooking elements are notched as at 84, one for the passage of the lug 83 and the other for registration with the socket 82.

The manner of setting up the means for closing the electrical heating circuit enables any one of the cooking elements to be active, then furthermore it permits of all of the cooking elements being simultaneously active. When a cooking element is withdrawn the circuits for the other elements are not opened, as the plug of the withdrawn cooking element is free of the contact device. The plugs of the cooking elements are selectively positionable with respect to the contact devices, under such conditions the cooking elements can be independently and selectively made active or inactive. Each cooking element can be used when desired independent of the others. One cooking element can be employed to produce a different style of food product with respect to the other elements, this is arranged for by different styles of cooking plates.

By setting up the cooking elements in superposed relation a compact apparatus is provided which occupies a materially smaller space than if the cooking elements were arranged sidewise with respect to each other.

By constructing each cooking element with a continuous groove 54, the overflow dough is collected and prevented from running down the sides and ends of the carrier thereby overcoming any unsightly appearance with respect to the cooking element.

The arm 57 coacts with the stop 58 to prevent the entire withdrawal of a cooking element from a compartment, and after the outward movement of the cooking element has been arrested by the stop 58, in connection with the arm 57, the section 31 of the cooking element can be thrown open so that access can be had to the interior of such element. The arm 57 in connection with the stop 58 also provides means for coupling the cooking element to the housing when the cooking element is projected from the open front of the compartment.

It is thought the many advantages of a cooking apparatus, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. An electrical cooking apparatus comprising a housing formed with superposed compartments open at the front thereof, a sectional cooking element slidably mounted in and capable of being extended from the front of each compartment, each element having each of its sections provided with an electric heater, a normally open heating circuit common to the heaters of each element and provided with a terminal, spaced electrical terminals carried by the housing, arranged in the path of movement of said elements and coacting with the terminals of the normally open heating circuits for selectively closing said circuits, a supply circuit common to the terminals carried by the housing, and vertically disposed, coacting means carried by the front of the housing and at the rear of said elements for coupling the elements to the housing when the elements are extended from the front of the compartments.

2. An electrical cooking apparatus comprising a housing open at the front, thereof, a plurality of electrical cooking elements slidably mounted in the housing and adapted to be extended from the front of the latter, each of said elements provided at its rear with a vertically disposed plate, each of said elements including an electrical heating means and a normally open heating circuit therefor provided with a terminal mounted in said plate, said housing including means for spacing said elements from each other, spaced electrical terminals carried by the rear of the housing and arranged in the path of movement of said elements and coacting with the terminals carried by said plates for selectively closing the normally open heating circuits, and a supply circuit common to the terminals carried by the housing, said housing having its front provided with depending means and said plates formed with means coacting with said depending means for coupling the elements to the housing when the elements are extended from the front of the latter.

3. An electrical cooking apparatus comprising a housing open at its front, a plurality of electrical cooking elements slidably mounted in the housing and each provided with an electrical heating means and a normally open heating circuit including a terminal, said housing including means arranged therein for spacing said elements from each other and for supporting said elements, each of said elements provided at its rear with a vertically disposed plate carrying a terminal, rollers carried by said elements and travelling on said supporting means, spaced electrical terminals carried by the housing at the rear thereof and arranged in the path of movement of said elements and coacting with the terminals on the plates for selectively closing the normally open heating circuits, and a supply circuit common to said terminals carried by the housing, said housing provided at its front with depending means and said plates provided with vertically extending means coacting with the depending means for coupling the elements to the housing when the elements are extended from the front thereof.

4. An electrical cooking apparatus comprising a housing open at the front thereof, a plurality of electrical cooking elements slidably mounted in the housing and adapted to be extended from the front of the latter, each of said elements provided at its rear with a vertically disposed plate, each of said elements including an electrical heating means and a normally open heating circuit therefor provided with a terminal mounted in said plate, said housing including means for spacing said elements from each other, spaced electrical terminals carried by the rear of the housing and arranged in the path of movement of said elements and coacting with the terminals carried by said plates for selectively closing the normally open heating circuit, a supply circuit common to the terminals carried by the housing, said housing having its front provided with depending means and said plates formed with means coacting with said depending means for coupling the elements to the housing when the elements are extended from the front of the latter, and means mounted on the top of the housing for controlling and regulating the heating circuits.

In testimony whereof, I affix my signature hereto.

PETER S. BANFF.